United States Patent [19]

Schwab

[11] Patent Number: 4,950,516
[45] Date of Patent: Aug. 21, 1990

[54] POLYETHYLENE AS UV PHOTODEGRADANT FOR POLYSTYRENE

[75] Inventor: Frederick C. Schwab, Metuchen, N.J.

[73] Assignee: Mobil Oil Corporation, New York, N.Y.

[21] Appl. No.: 378,110

[22] Filed: Jul. 11, 1989

[51] Int. Cl.$^5$ ............... C08L 23/04; C08L 23/18; C08L 25/06
[52] U.S. Cl. ............... 428/36.92; 525/240; 522/112; 426/106; 204/157.15
[58] Field of Search ............ 525/240; 428/36.92; 522/112; 204/157.15

[56] References Cited

U.S. PATENT DOCUMENTS

| 3,894,117 | 7/1975 | Agouri et al. | 525/240 |
| 4,255,531 | 3/1981 | Arbit | 525/237 |
| 4,352,908 | 10/1982 | Murray | 525/98 |
| 4,579,912 | 4/1986 | Canterino et al. | 525/240 |
| 4,689,367 | 8/1987 | Gunesin et al. | 525/240 |
| 4,690,967 | 9/1987 | Hahnfeld | 525/240 |
| 4,716,197 | 12/1987 | Seiss et al. | 525/240 |
| 4,716,201 | 12/1987 | Canterino et al. | 525/240 |
| 4,826,920 | 5/1989 | Dobreski | 525/240 |

FOREIGN PATENT DOCUMENTS 49-051341  5/1974  Japan .

OTHER PUBLICATIONS

Chemicalweek-A Better Styrene Goes Commercial-2/1982, pp. 42 and 45.

Primary Examiner—Carman J. Seccuro
Attorney, Agent, or Firm—A. J. McKillop; C. J. Speciale; M. V. Schneller

[57] ABSTRACT

Linear polyethylenes are added to crystal, clear transparent polystyrene to accelerate the degradation of polystyrene on exposure to ultraviolet light.

12 Claims, No Drawings

POLYETHYLENE AS UV PHOTODEGRADANT FOR POLYSTYRENE

FIELD OF THE INVENTION

It was discovered that blending small amounts of polyethylene into clear transparent polystyrene accelerated the degradation of polystyrene on exposure to UV light.

BACKGROUND OF THE INVENTION

Polystyrene is used in packaging and disposable service ware associated with the food packaging and fast-food service markets. In these applications, it can be desirable to provide the polystyrene as a composition which is photodegradable on exposure to UV light.

The current emphasis on ecology, and in particular, the disposal of bulk rubbish, is in part directed to coping with the tremendous increase in the use of plastic containers and plastic films for packaging foodstuffs, and garbage wraps and the like which not only present a serious disposal problem but increase unsightly litter in picnic areas, on roadside and the like.

The actual decomposition of polystyrenes is relatively slow and hence despite some discoloration and/or embrittlement when exposed to sunlight these plastic materials tend to remain substantially intact for relatively long periods of time.

SUMMARY OF THE INVENTION

The present invention relates to a polystyrene composition in film or package form, foamed or unfoamed, which has been modified to render it more readily decomposable on exposure to ultraviolet light.

The invention relates to a composition of matter comprising ultraviolet degradable polyethylene modified polystyrene and to method for accelerating the degradation of polystyrene on exposure to ultraviolet light.

The present invention also includes food wrapped or contained in films or packaging materials, foamed or unfoamed, from polystyrene modified in accordance with the invention.

DETAILED DESCRIPTION OF THE INVENTION

The invention relates to a composition of a crystal polystyrene and an amount of polyethylene polymer effective to accelerate the degradation of the styrene polymer on exposure to light.

The amounts of the ethylene polymer can range from 0.1 to 10 weight percent of the composition. The ethylene polymer can be introduced into the composition in any convenient manner, such as by direct addition or by introduction with a master batch containing ethylene polymer and a styrene polymer and a higher concentration of the polyethylene than necessary. The master batches than can be diluted with additional virgin polystyrene to achieve the necessary concentration in the composition as disclosed herein.

The ethylene polymer can be a high density polymer of ethylene or a linear low density polymer of ethylene. Linear low density ethylene polymers are copolymers of ethylene and a higher olefin and contain a sufficient amount of the higher olefin so that the copolymer has a density in the range of about 0.90 to about 0.94, preferably 0.91 to 0.93. The higher olefin is commonly 1-butene, 1-hexane, 4-methyl-1-pentene or 1-octene. Such materials are disclosed in U.S. Pat. No. 4,076,698 which is incorporated herein by reference in its entirety, and are widely available.

The composition of the invention can also contain conventional ingredients, such as fillers, antioxidants, stabilizers and the like.

These compositions can be used as films, as skins on other biodegradable or photodegradabel substrates or as packages per se in unfoamed or foamed conditions.

The invention will be illustrated by the following examples.

EXAMPLES

Polystyrene 1800 was blended via Brabender with two weight percent of the following polyethylenes;

Blended (via Brabender) two weight percent of the following polyethylenes into Polystyrene 1800:
Union Carbide 1137—very low density PE (VLDPE)
Mobil MJA042 —linear low density PE (LLPDE)
Mobil 5340D —high density polethylene (HDPE)

The composition were exposed to ultraviolet radiation in QUV Weather-O-Meter for 200 hours. Loss of molecular weight as function of exposure time was measured.

| Time, Hrs | PS1800 | VLDPE | LLDPE | HDPE |
|---|---|---|---|---|
| 0 | 100 | 100 | 100 | 100 |
| 50 | 100 | 91 | 92 | 90 |
| 100 | 97 | 80 | 78 | 81 |
| 150 | 91 | 71 | 64 | 73 |
| 200 | 90 | 63 | 55 | 56 |

% molecular weight retained.

The surprising outcome of the study was that the polyethylene, when exposed to UV radiation, caused the degradation of the polystyrene matrix.

Although the present invention has been described with respect to preferred embodiments, it is to be understood that modifications and variations may be restored to, without departing from the spirit and scope of this invention, as those skilled in the art will readily understand. Such modifications and variations are considered to be within the purview and scope of the appended claims.

What is claimed is:

1. An ultraviolet light exposed composition consisting essentially of crystal polystyrene which is clear and transparent and an amount ranging from 0.1 to 10 weight percent of the composition of a linear polymer of ethylene effective to accelerate the degradation of the polystyrene matrix on exposure to ultraviolet light, the exposed composition having a loss of molecular weight due to exposure to the ultraviolet light.

2. The composition of claim 1, wherein the polyethylene is linear low density polyethylene.

3. The composition of claim 1, wherein said linear polymer is high density polyethylene.

4. A method for accelerating the degradation of crystal polystyrene on exposure to ultraviolet light comprising providing an amount ranging from 0.1 to 10 weight percent of the composition of a linear polyethylene and compounding it with crystal polystyrene which amount of linear polyethylene is effective to accelerate the degradation of the polystyrene on exposure to ultraviolet light and subsequently exposing the linear polyethylene containing polystyrene to ultraviolet light to cause a decrease in weight of the polystyrene.

5. The method of claim 4, wherein the polyethylene is linear low density polyethylene.

6. The method of claim 4, wherein the polyethylene is high density polyethylene.

7. A foodstuff wrapped in a disposable film wherein the film is formed of the composition of claim 1.

8. A foodstuff in a container formed on the composition of claim 1.

9. A foodstuff wrapped in a disposable film wherein the film is formed of the composition of claim 2.

10. A foodstuff in a container formed of the composition of claim 2.

11. A foodstuff in a film, wherein the film is formed by the composition of claim 1.

12. A foodstuff in a container fabricated of the composition of claim 1.

* * * * *